United States Patent Office 3,216,536
Patented Nov. 9, 1965

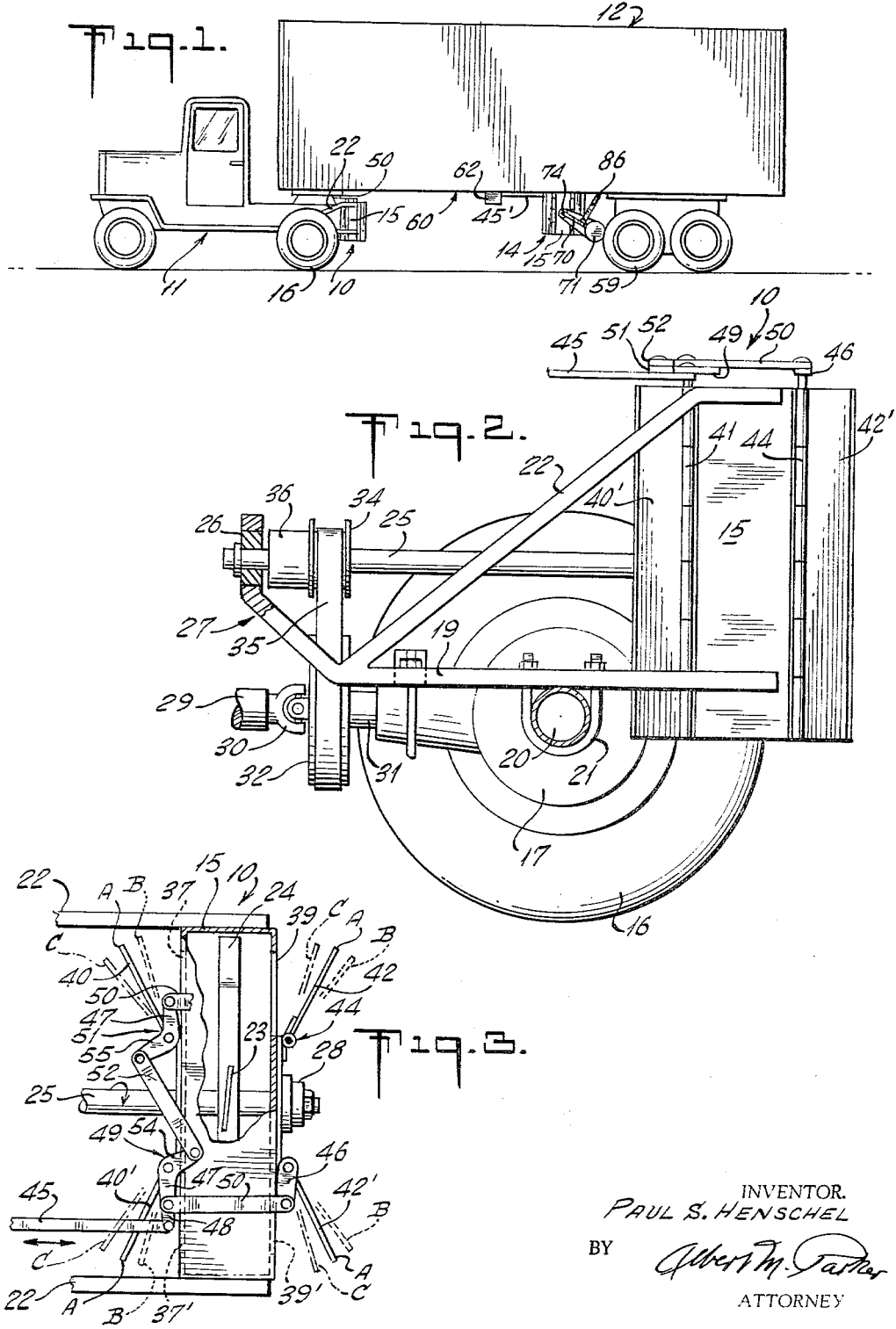

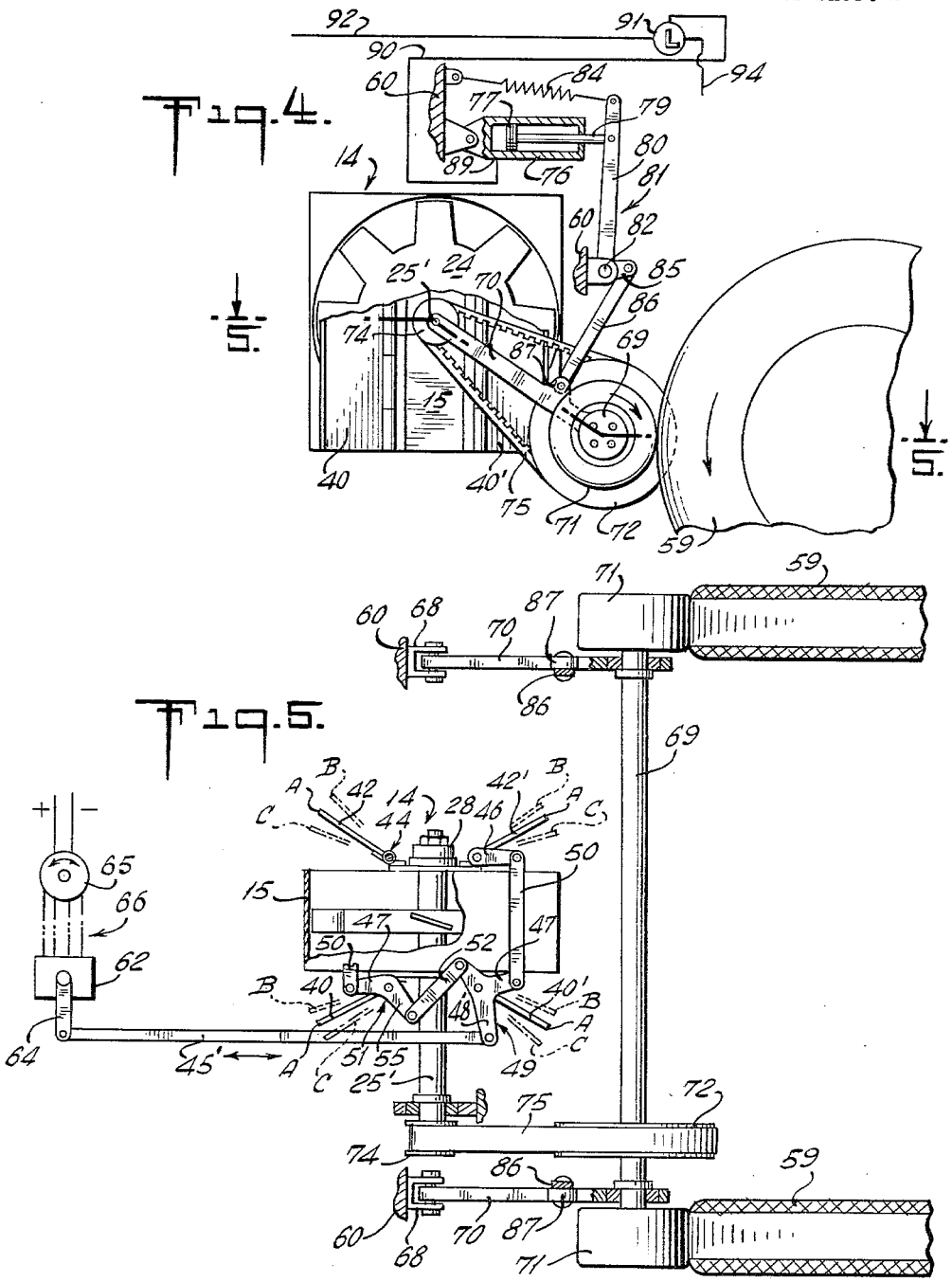

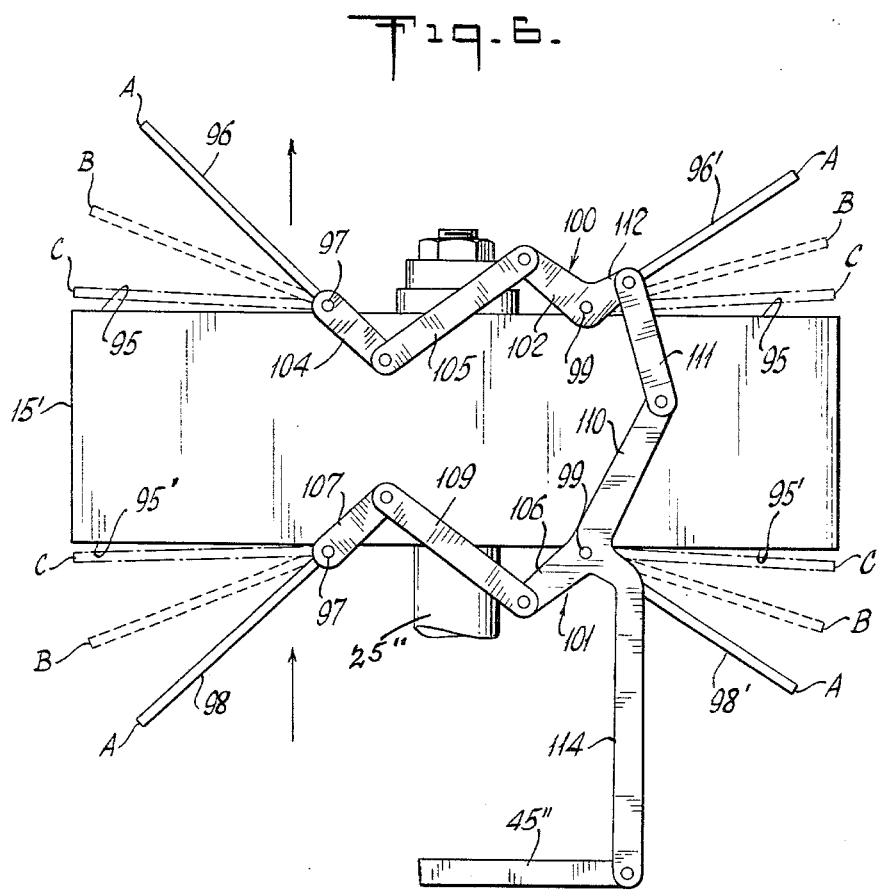

3,216,536
CONTROLLED, AIR OPERATED, RETARDING DEVICE
Paul S. Henschel, Richard Road, R.F.D. 3, Box 446, Gales Ferry, Conn.
Filed Mar. 26, 1965, Ser. No. 444,941
8 Claims. (Cl. 188—90)

This application is a continuation-in-part of application Ser. No. 311,087, filed September 24, 1963, and now abandoned.

This invention relates to a retarding device for rotating mechanism. The device of the invention may be used to advantage, for example, for retarding a wheeled vehicle, such as a truck.

When employed on a wheeled vehicle the retarding device of the invention provides a means for controlling the speed of the vehicle when it descends a hill which is too steep and/or winding to allow the vehicle to coast without braking. The retarding device is also designed to aid in the normal braking of the vehicle at relatively high speeds.

Vehicles when descending long hills which are too steep for coasting without braking, normally down-shift to a lower gear and brake to maintain a safe descending speed. This normally means that a very slow descending speed must be maintained; it often causes overheating of the vehicle's brakes. Even if brake failure or dangerous brake overheating does not occur, "fading" of the brakes through heating may take place so that normal braking of the vehicle can not take place in an emergency situation.

The retarding device of the present invention is designed to absorb enough power from the vehicle to restrain the vehicle to a safe descending speed without itself becoming overheated and without undue use of the regular braking system of the vehicle. The retarding device of the invention, which employs atmospheric air as a retarding medium, has little or no tendency to become heated in spite of its use over very substantial lengths of time. The device includes a variable loading feature which allows the driver to maintain a range of restraint upon the speed of the vehicle as he would normally do with the regular braking system.

Although the retarding device of the invention is described herein in connection with its use on a wheeled vehicle, the device is not limited thereto.

The invention has among its objects the provision of a novel retarding device for a rotating mechanism.

Another object of the invention is the provision of a retarding device for rotating mechanism, such retarding device being free from substantial heating effects despite its use over substantial periods of time.

Yet another object of the invention is the provision of a novel retarding device, the retarding effect of which remains substantially constant for each adjusted position on its control mechanism, regardless of the length of time that the retarding mechanism has been in use.

A further object of the invention is the provision of a retarding device of the character indicated which is economically made and installed, and which is easily controlled and maintained.

A still further object of the invention resides in the provision in a wheeled vehicle of a novel retarding device of the invention.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in side elevation of a tractor-trailer vehicle, the tractor of the vehicle being provided with a first embodiment of retarding device in accordance with the invention and the trailer of the vehicle being provided with a second embodiment of such device;

FIG. 2 is a view in vertical section on an enlarged scale transversely through the rear axle of the tractor of the vehicle shown in FIG. 1, the view showing the retarding mechanism mounted on the tractor of the vehicle, a portion of the fan housing of the retarding device being broken away for clarity of illustration;

FIG. 3 is a view in plan of the fan mechanism of the retarding device of FIG. 2, the interconnected closure members for the inlet and exhaust ports of the fan housing being shown in three alternative adjusted positions, A, B, and C;

FIG. 4 is a fragmentary view in side elevation of a second illustrative embodiment of retarding device in accordance with the invention, such device being that shown in FIG. 1 mounted on the trailer of the vehicle, the control for selectively rendering the retarding device operative being shown somewhat schematically;

FIG. 5 is a fregmentary view in plan of the retarding device of FIG. 4, the view being taken from the point of view of line 5—5 of FIG. 4 in the direction of the arrows, the control for varying the retarding effect of the retarding device being shown somewhat schematically; and FIG. 6 is a fragmentary view in plan of the blower portion of a third embodiment of retarding device in accordance with the invention.

As is evident from the above, three illustrative embodiments of retarding device in accordance with the invention are shown and described herein, all of such devices being shown employed on the vehicle of FIG. 1. The first embodiment of retarding device, generally designated 10, is shown mounted upon the tractor 11 of the tractor-trailer vehicle shown in FIG. 1. The second embodiment of retarding device, generally designated 14, is shown as being mounted upon the trailer 12 of the vehicle, so as selectively to retard the rear wheels thereon. Device 10 is shown more specifically in FIGS. 2 and 3. Device 14 is shown in detail in FIGS. 4 and 5. A third embodiment of retarding device, differing from the first two embodiments in the construction and manner of operation of the closure means for the blower device, is shown in FIG. 6.

Turning now to FIGS. 1, 2, and 3, the first embodiment of retarding device, generally designated 10, is shown mounted on the rear of the frame of the tractor 11. Device 10 includes a fan casing or housing 15 which is supported between the rear wheels 16 of the tractor and behind the differential housing 17 thereof. Casing 15 is supported between the rear ends of laterally spaced horizontal members 19 which are affixed to the rear axle 20 of the tractor by U-clips 21, as shown. The forward ends of members 19 are connected to a cross member as shown, the cross member being similarly secured to the central forward portion of the differential housing of the tractor. Laterally spaced angularly directed brace members 22 are connected between the top of the fan casing and the forward ends of members 19, as shown.

In the illustrative embodiment the propeller 24 of the fan is provided with a series of angularly disposed blades 23 spaced peripherally thereabout. The fan is mounted on a shaft 25 which is carried at its forward end in a bearing 26 and at its rear end in a bearing 28 affixed to the rear wall of the fan casing 15. Bearing 26 is mounted on a supporting framework generally designated 27 which is connected to members 19 and 22.

Shaft 25 is driven from the propeller shaft 29 of the truck, which is connected in the usual manner to the pinion shaft 31 through the universal joint 30. A pulley 32 is affixed to pinion shaft 31 so as to rotate therewith, pulley 32 driving a pulley 34 which is mounted upon and freely rotatable with respect to the shaft 25 through the medium of a belt 35 entrained over the pulleys. Belt 35 may be, for example, of the "timing belt" type, which has positive engagement with the pulleys 32 and 34. Pulley 34 is selectively connected to the shaft 25 through the medium of a clutch 36 which may, for example, be of either the fluid or electrically controlled types.

In the embodiment shown, the fan blades 23 are of such angularity that they impel air through the casing 15 in the direction from front to rear when the vehicle is going forward and the fan shaft 25 is rotated in the direction of the curved arrows in FIG. 3. When the vehicle is backing up, the fan shaft 25 rotates in a reverse direction. Because of the symmetrical construction of the fan casing and its ports, as will be evident below, the retarding device 10 is equally effective in both directions of rotation of the fan 24. Preferably, the tips of blades 23 of the fan closely confront the inner peripheral wall of the casing, as shown.

The fan casing 15 is provided with two ports 37 and 37', herein called the "inlet ports," in its forward wall, and two ports 39 and 39', herein termed the "outlet ports," in its rear wall. Such ports are located so as to communicate directly with the space in casing 15 containing the outer, bladed periphery of the fan. The ports 37 and 37' are provided with closure members 40 and 40', respectively, such closure members being in the nature of door members hinged at their laterally inner edges so as to swing about vertical axes. The ports 39 and 39' are provided with similar closure members 42 and 42'. The closure members may be mounted, for example, on hinges attached to the casing 15 at locations boarding the inner edges of the ports therein; the hinges mounting closure members 40 and 40' are designated 41 and those mounting closure members 42 and 42' are designated 44.

The closure members are interconnected so that as members 40 and 40' progressively closure, members 42 and 42' progressively open, and vice-versa. Such opening and closing of the closure members is under the control of a rod 45 which may be connected to a suitable control device (not shown) conveniently mounted in the cab of the tractor 11. Specifically, the means thus connecting the closure members is formed by two parallel arms 46 and 47 which are connected to the upper ends of stub shafts which project from the inner edges of the closure members at the rear and front ends, respectively, of the housing 15. Each pair of arms 46 and 47 is pivotally connected together by a cross link 50. One arm 47 is a part of a first bell crank 49; the other arm 47 is a part of a second bell crank 51. Bell cranks 49 and 51 are provided with reversely extending, parallel arms 54 and 55, respectively, the outer ends of such arms being pivotally connected by a second cross link 52. It will be evident that upon movement of the control rod 45 to the right in FIG. 3, closure members 40 and 40' are progressively closed, whereas closure members 42 and 42' are progressively opened. When control rod 45 is moved to the left, members 42 and 42' progressively close, whereas members 40 and 40' progressively open. In FIG. 3 the closure members are shown in full lines in a mid-position A, the closure members being shown in two other adjusted positions B and C in dotted lines and dot and dash lines, respectively.

The retarding effect of the device 10 may be varied as required by appropriate adjustment of the positioning of the closure members by the control rod 45. The closing of the outlet ports 39 and 39' of the fan or blower housing with the inlet ports 37 and 37' wide open provides a maximum braking effect. When the closure members 37, 37', 39, and 39' are all open an equal amount, the device 10 provides a minimum braking effect. The illustrative interconnection between the inlet and outlet closure members permits variation of the retarding effect of the device throughout its entire range with only one control motion.

The retarding device 14 which is associated with the trailer 12 of the vehicle is shown in detail in FIGS. 4 and 5. The fan casing, the fan therein, the closure members and the interconnections therebetween are the same as those in the device 10. Consequently, such elements of device 14 are designated by the same reference characters with the exception of the fan shaft, which for clarity is designated 25', and for the arm 48' of the bell crank of the closure member linkage to which the control rod 45' is connected. Device 14 is shown as being mounted on the trailer so as to be selectively driven by one pair of the wheels thereof. Such arrangement is particularly advantageous with a semi or complete trailer, since it tends to prevent jack-knifing of the trailer, particularly when the road surface is slippery. Device 14 is mounted as shown in FIG. 1 by being suspended from the body, generally designated 60, of the trailer 12 by means of a mounting framework generally indicated. Because the device 14 is mounted on the trailer remote from the tractor 11, it is provided with the control rod 45' to be operated as follows: Rod 45' extends forwardly to be pivotally connected to the outer end of a crank arm 64 of a reversible geared motor 62 which is mounted on the body 60 of the trailer as shown. Motor 62 is in turn under the control of a reversing switch 65 which may be conveniently mounted in the cab of the tractor 11. A cable designated 66 and containing four wires, extends between the switch 65 in the cab and the motor 62 on the trailer, the motor being energized through the switch 65 from a suitable source of electricity such as the battery of the tractor 11. Such system permits the driver, by turning the control knob of switch 65 in the appropriate direction, to adjust the closure members to the desired position. Following this a return of the control knob to its central position will stop motor 62, the motor then functioning to maintain the closure members for the inlet and exhaust ports of the fan casing in their adjusted position.

Mechanism is provided for selectively connecting the fan shaft 25' of the retarding device 14 to said one pair of the wheels of the trailer. In the embodiment shown, the driving means for the fan takes the form of a cross shaft 69 which is rotatably mounted in suitable bearings affixed to the rear ends of parallel links 70. The forward ends of such links are pivotally mounted in U-shaped brackets 68 which are affixed to the frame 60 of the trailer, as indicated, the pivotal axis of the forward ends of links 70 being aligned with the axis of the fan shaft 25'. Fixedly mounted on the outer ends of shaft 69 are friction wheels 71 which may be rubber-tired. A pulley 72 on shaft 69 is connected to drive a pulley 74 on fan shaft 25' through a belt 75. The friction wheels 71 may be presented to the wheels 59 of the trailer as shown in FIGS. 1, 4, and 5, or may be retracted therefrom so as to disengage the retarding means 14 from the trailer. Preferably, such action is under the control of the driver so that he may apply a retarding effect to the rear wheels of the trailer as required. For this purpose there are provided two air cylinders 76 (one shown), each having a piston 77 reciprocable therewithin, the piston having a piston rod 79. The outer end of each of the piston rods 79 is pivotally connected to a respective arm 80 of two bell cranks 81 (one shown in FIG. 4). Each of the bell cranks 81 is pivotally connected at 82 to a portion of the body 60 of the trailer. A second, shorter, generally horizontally projecting arm 85 of each of the bell cranks 81 is connected to the respective one of the links 70 by a further link 86. A coil tension spring 84 connected between a portion of the body 60 of the trailer and the upper end of arm 80 of each of the bell cranks 81 constantly urges the friction wheels 71 into engagement with the wheels 59 of the trailer. The device shown is particularly of advantage, since, should the source of compressed gas fail, the springs 84 will always urge the levers 81 toward the position in which friction wheels 71 engage the wheels of the vehicle, thus to retard the vehicle.

The two cylinders 76 are connected in parallel. Each of the air cylinders 76 is provided with an inlet port 89 which is connected by conduit 90 to a conventional control valve 91, which may be mounted in a convenient location in the cab of the tractor 11. Valve 91 is connected to a suitable source of compressed gas by a conduit 92, and is connected to an exhaust conduit 94. When the valve 91 is positioned to connect the pressure source to the ports 89 of cylinders 76 the pistons 77 of the air cylinders are thrust outwardly to overcome the springs 84 and to retract the friction wheels 71 from the wheels 59 of the trailer. When it is desired to activate the retarding device 14, the valve 91 is positioned to cut off the flow of compressed gas through the conduit 92 and to connect the inlet ports 89 to the exhaust conduit 94. Thereupon the springs 84 return the shaft 69 and the friction wheels 71 thereon to their active positions shown in FIGS. 1, 4 and 5.

As above noted, the embodiment of the retarding device fragmentarily shown in FIG. 6 differs from that of FIG. 5 in the construction and manner of operation of the blower of the retarding device, specifically the closure means therefor.

The casing of the blower of FIG. 6 is designated 15', and the shaft bearing a blower rotor (not shown) within the casing is designated 25''. The casing and shaft of FIG. 6 may be disposed in the same manner as those of FIG. 5, and the shaft 25'' may be driven in the same manner as shaft 25' in FIG. 5. The casing 15' has outlet ports 95, on one side thereof, at the top, as shown in FIG. 6, and inlet ports 95' in the opposite side, shown at the bottom in FIG. 6. The ports 95 and 95' are closed to varying degrees by port closure members 96, 96' and 98, 98', respectively, in the form of doors pivoted at 97 and 99. The port closure members are shown in approximately fully opened positions at A, in intermediate positions at B, and almost fully closed at C. As will appear hereinbelow, the port closure members are interconnected so that as members 98, 98' progressively close from their fully open positions members 96, 96' first open to a point where their opening is approximately equal to that of members 98, 98', then return to their fully closed positions simultaneously with the closing of members 98, 98'.

Such simultaneous adjustment of port closure members 96, 96' and 98, 98', in the embodiment of FIG. 6, is effected as follows: A first bell crank 100, fixedly connected to the upper port closure member 96', as shown in FIG. 6, turns therewith about the pivotal connection 99 for such port closure members. A second bell crank 101, fixedly connected to the lower port closure member 98' as shown in FIG. 6 turns therewith about the pivotal connection 99 for such port closure member. Bell crank 100 has a first arm 102 which is pivotally connected by a link 105 to a lever 104, which is fastened to the upper port closure member 96 and turns therewith about the upper pivotal connection 97. Arm 102 and lever 104 are of the same length, and are oppositely angularly disposed with respect to the upper side of the blower casing, as shown in FIG. 6.

The second bell crank 101 has a first arm 106 which is connected by a link 109 to a lever 107, which is fastened to the lower left port closure member 98 and turns therewith about its pivotal connection 97. The arm 106 and lever 107, which are oppositely angularly disposed with respect to the lower side of the blower casing, as shown in FIG. 6, are of the same length as arm 102 and lever 104.

The bell cranks 100 and 101 are connected as shown. Thus a second arm 110 of bell crank 101 extends across the top of casing 15' and is connected to a second arm 112 of the bell crank 100 by a link 111. The arm 100 and link 111 constitutes a toggle. The bell crank 101 is further provided with a lever arm 114 which is disposed with its length generally parallel with shaft 25''. Such lever arm 114, which generally corresponds to lever arm 48' of FIG. 5, is moved by an elongated rod, fragmentarily shown at 45'', which is connected to suitable means for adjusting the port closure members. Such means may be similar to that shown in FIG. 5 drivingly connected to the closure member adjusting rod 45'.

It will be evident that upon movement of the control rod 45'' to the right from its position in FIG. 6, closure members 98 and 98' progressively close, whereas closure members 96 and 96' first open somewhat more until lever arm 110 and link 111 lie in alignment. After this, closure members 96 and 96' progressively close and reach their fully closed positions simultaneously with members 98 and 98'. When control rod 45 is moved to the left from its position in FIG. 6, members 98 and 98' progressively open somewhat more, whereas members 96 and 96' progressively close. In FIG. 6 the closure members are shown in full lines in a mid position A, the closure members being shown in two other adjusted positions B and C in dotted lines and dot and dash lines, respectively.

The retarding effect of the blower device is substantially at its mean or intermediate value when the closure members are in position A in FIG. 6. Such retarding effect may be varied as required by appropriate adjustment of the positioning of the closure members by the control rod 45. The closing of the inlet ports 95' (position C thereof) of the fan or blower housing 15' with the outlet ports 95 also closed (position C thereof) provides a minimum braking effect. When the closure members 98, 98' for the inlet ports 95' are open (position A thereof) and the outlet ports 95 are also open (position A thereof), the device provides an intermediate braking effort. Maximum braking effort is obtained when the inlet ports 95' are open and the outlet ports 95 are shut. Thus to decrease the braking effect of the blower device of FIG. 6 the rod 45'' is thrust to the right from the position shown, whereas to increase the braking effect the rod 45'' is pulled to the left from the position shown.

The retarding blower and its controls of FIG. 6 provides a greater range of adjustment than that yielded by the blower devices of FIGS. 3 and 5. With the device of FIG. 6 the maximum braking effort is the same as that of the devices of FIGS. 3 and 5, but the minimum braking effort afforded by the device of FIG. 6 is considerably less than that which is possible with the devices of FIGS. 3 and 5.

As above indicated, the retarding device of the invention is not limited to its use on a wheeled vehicle. Thus, for example, it may be used to advantage in retarding other apparatus, such as elevators, cable lifts, etc. In each such application the device is of particular advantage because of its ability to absorb its braking load continuously without wear or overheating. The heat developed through operation of the retarding device is continuously abstracted therefrom by the air which flows therethrough, such air itself being employed as the retarding medium. Because of its substantially constant retarding effect, regardless of the duration of its continuous use, the retarding device of the invention may also be used to advantage as a power absorbing device to take the place, for example, of a conventional prony brake, and/or electrodynamometer.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention will now be apparent to those skilled in the art.

What is claimed is:

1. A retarding device for mechanism having a rotatable shaft, which comprises a rotatable air impelling fan, a housing enclosing the fan and having an air inlet port and an air exhaust port, both of said ports communicating with the atmosphere, adjustable closure means for each of said ports, means to adjust said port closure means, said adjusting means comprising means connecting the air inlet and exhaust port closure means for simultaneous adjustment so that the respective closure means are moved in reverse directions relative to their respective ports, and means for selectively connecting the fan in driving relationship with said shaft.

2. A vehicle having ground engaging wheels, and mechanism cooperating with at least one of said wheels for retarding the vehicle, the retarding mechanism comprising a rotatable air impelling fan, a housing enclosing the fan and having an air inlet port and an air exhaust port, both of said ports communicating with the atmosphere, adjustable closure means for each of said ports, means to adjust said port closure means, said adjusting means comprising means connecting the air inlet and exhaust port closure means for simultaneous adjustment, and means for selectively connecting the fan in driving relationship with said one wheel of the vehicle.

3. A vehicle having ground engaging wheels, and mechanism cooperating with at least one of said wheels for retarding the vehicle, the retarding mechanism comprising a rotatable air impelling fan, a housing enclosing the fan and having an air inlet port and an air exhaust port, both of said ports communicating with the atmosphere, adjustable closure means for each of said ports, means to adjust said port closure means, said adjusting means connecting the air inlet and exhaust port closure means for simultaneous adjustment is such that the respective closure means are movable in reverse directions relative to their respective ports, and means for selectively connecting the fan in driving relationship with said one wheel of the vehicle.

4. A vehicle having ground engaging wheels, and mechanism cooperating with at least one of said wheels for retarding the vehicle, the retarding mechanism comprising a rotatable air impelling fan, a housing enclosing the fan and having an air inlet port and an air exhaust port, both of said ports communicating with the atmosphere, adjustable closure means for each of said ports, each of the port closure means comprising a clapper hinged to the housing, the ports being in the form of openings in the housing, the clappers in closed position closely overlying the respective ports in the housing, means connecting the clappers for simultaneous adjustment so that the respective closure means are moved in reverse directions relative to their respective ports, whereby when one clapper is closed the other is fully open, and vice versa, and means for selectively connecting the fan in driving relationship with said one wheel of the vehicle.

5. A retarding device for mechanism having a rotatable shaft, which comprises a rotatable air impelling fan, a housing enclosing the fan and having an air inlet port and an air exhaust port, both of said ports communicating with the atmosphere, adjustable closure means for each of said ports, means to adjust said port closure means, said adjusting means comprising means connecting the air inlet and exhaust port closure means for simultaneous adjustment, said last named means being so constructed and arranged that from a position of intermediate braking, with the inlet and exhaust port closure means open in substantially equal amounts, progressive movement of the inlet closure means toward closed position first opens the outlet closure means further and then closes such means progressively, and progressive movement of the inlet closure means toward further open position progressively closes the outlet closure means, and means for selectively connecting the fan in driving relationship with said shaft.

6. A retarding device as claimed in claim 5, wherein each of the port closure means comprises a clapper hinged to the housing, the ports being in the form of openings in the housing on opposite sides thereof, the clappers in closed position closely overlying the respective ports in the housing, and wherein the means connecting the clappers for simultaneous adjustment comprises a crank arm connected to each of the clappers, and a toggle means connecting the outer ends of the crank arms.

7. A vehicle having ground engaging wheels, and mechanism cooperating with at least one of said wheels for retarding the vehicle, the retarding mechanism comprising a rotatable air impelling fan, a housing enclosing the fan and having an air inlet port and an air exhaust port, both of said ports communicating with the atmosphere, adjustable closure means for each of said ports, means to adjust said port closure means, said adjusting means comprising means connecting the air inlet and exhaust port closure means for simultaneous adjustment, said last named means being so constructed and arranged that from a position of intermediate braking, with the inlet and exhaust port closure means open in substantially equal amounts, progressive movement of the inlet closure means toward closed position first opens the outlet closure means further and then closes such means progressively, and progressive movement of the inlet closure means toward further open position progressively closes the outlet closure means, and means for selectively connecting the fan in driving relationship with said one wheel of the vehicle.

8. A vehicle as claimed in claim 7, wherein each of the port closure means comprises a clapper hinged to the housing, the ports being in the form of openings in the housing on opposite sides thereof, the clappers in closed position closely overlying the respective ports in the housing, and wherein the means connecting the clappers for simultaneous adjustment comprises a crank arm connected to each of the clappers, and a toggle means connecting the outer ends of the crank arms.

References Cited by the Examiner

UNITED STATES PATENTS

| 1,259,863 | 3/18 | Hewitt | 188—97 |
| 2,415,670 | 2/47 | Black et al. | 188—90 |

FOREIGN PATENTS

| 812,657 | 2/37 | France. |
| 45,723 | 12/08 | Switzerland. |

FERGUS S. MIDDLETON, *Primary Examiner.*

MILTON BUCHLER, *Examiner.*